(12) United States Patent
Naritomi et al.

(10) Patent No.: US 9,166,212 B2
(45) Date of Patent: Oct. 20, 2015

(54) METAL-RESIN COMPLEX AND PROCESS FOR PRODUCTION THEREOF

(75) Inventors: Masanori Naritomi, Tokyo (JP); Naoki Andoh, Tokyo (JP)

(73) Assignee: TAISEI PLAS CO., LTD., Tokyo (JP)

( * ) Notice: Subject to any disclaimer, the term of this patent is extended or adjusted under 35 U.S.C. 154(b) by 184 days.

(21) Appl. No.: 13/989,943

(22) PCT Filed: Nov. 25, 2011

(86) PCT No.: PCT/JP2011/077221
§ 371 (c)(1),
(2), (4) Date: Aug. 5, 2013

(87) PCT Pub. No.: WO2012/070654
PCT Pub. Date: May 31, 2012

(65) Prior Publication Data
US 2014/0065472 A1    Mar. 6, 2014

(30) Foreign Application Priority Data

Nov. 26, 2010  (JP) .................................. 2010-263235
Nov. 29, 2010  (JP) .................................. 2010-264652

(51) Int. Cl.
*H01M 2/08*       (2006.01)
*H01M 2/04*       (2006.01)
(Continued)

(52) U.S. Cl.
CPC ....... *H01M 2/0478* (2013.01); *B29C 45/14311* (2013.01); *H01M 2/0404* (2013.01); *H01M 2/06* (2013.01); *H01M 2/08* (2013.01); *H01M 4/661* (2013.01); *H01M 10/058* (2013.01); *H01M 10/0525* (2013.01); *B29C 2045/14237* (2013.01); *B29K 2705/02* (2013.01); *B29K 2705/10* (2013.01); *B29L 2031/7146* (2013.01);
(Continued)

(58) Field of Classification Search
CPC .................................. H01M 2/04; H01M 2/06
See application file for complete search history.

(56) References Cited

U.S. PATENT DOCUMENTS

2010/0189958 A1* 7/2010 Naritomi et al. .............. 428/141
2010/0279120 A1* 11/2010 Naritomi et al. .............. 428/413

FOREIGN PATENT DOCUMENTS

| JP | 2006-310834 A | 11/2006 |
| JP | 2008-131005 A | 6/2008 |

(Continued)

OTHER PUBLICATIONS

International Search Report for PCT/JP2011/077221, mailing date of Feb. 14, 2012, With English translation.

*Primary Examiner* — Jane Rhee
(74) *Attorney, Agent, or Firm* — Westerman, Hattori, Daniels & Adrian, LLP (57) ABSTRACT

A metal-resin composite having high gas sealing properties is provided. An aluminum alloy structure having a shape surrounding the copper 63 is firstly formed, and the attached aluminum alloy is made closely contact with the copper electrode 63 and further made engaged into the copper electrode 63 by pressing or forging. It is then machined into a predetermined shape so as to prepare the copper alloy 63 attached with an aluminum alloy part 61*a*. Subsequently, the surface treatment of the NMT or NMT 2 is given to three members of an aluminum electrode 62, the copper electrode 63 attached with the aluminum alloy part 61*a* and an aluminum alloy lid 61. These three members are inserted into an injection mold, and a thermoplastic resin composition 64 of PPS resin is injected. The lithium-ion battery lid 60 having a structure as shown in FIG. 11 is thus obtained.

6 Claims, 6 Drawing Sheets

(51) Int. Cl.
  *B29C 45/14* (2006.01)
  *H01M 2/06* (2006.01)
  *H01M 4/66* (2006.01)
  *H01M 10/0525* (2010.01)
  *H01M 10/058* (2010.01)
  *B29K 705/02* (2006.01)
  *B29K 705/10* (2006.01)
  *B29L 31/00* (2006.01)

(52) U.S. Cl.
  CPC ............... *H01M2/04* (2013.01); *Y02E 60/122* (2013.01); *Y02T 10/7011* (2013.01); *Y10T 428/24355* (2015.01)

(56) References Cited

FOREIGN PATENT DOCUMENTS

| | | |
|---|---|---|
| JP | 2011-238412 A | 11/2011 |
| WO | 03/064150 A1 | 8/2003 |
| WO | 2004/041532 A1 | 5/2004 |
| WO | 2008/047811 A1 | 4/2008 |
| WO | 2008/069252 A1 | 6/2008 |
| WO | 2008/078714 A1 | 7/2008 |
| WO | 2008/081933 A1 | 7/2008 |
| WO | 2009/011398 A1 | 1/2009 |

* cited by examiner

METAL-RESIN COMPLEX AND PROCESS FOR PRODUCTION THEREOF

TECHNICAL FIELD

The present invention mainly relates to a metal-resin composite that is composed of an aluminum alloy and a molded thermoplastic resin such as polyphenylene sulfide (hereinafter referred to as "PPS"), and a method for manufacturing the same. In more detail, the present invention relates to a metal-resin composite that hardly let gas molecules come through a joint boundary between an aluminum alloy and a molded thermoplastic resin and that has good gas sealing properties, and to a method for manufacturing the same.

BACKGROUND ART

Metal to metal adhesives and techniques of strongly joining metal to synthetic resin are required in a wide range of industrial fields beyond component manufacturing of automobiles, household appliances, industrial machines and the like, and many adhesives have been developed for this reason. That is, techniques of adhesion and joining are basic and applied key technology in all manufacturing industries.

Heretofore, joining methods without using adhesives have also been studied. Among them, it was "NMT (abbreviation of nano-molding technology)" that was developed by the present inventors and had a great impact on manufacturing industries. The NMT is a technique of joining an aluminum alloy with a resin composition (hereinafter, abbreviated as "injection joining") where molten engineering resin is injected onto an aluminum alloy part that is previously inserted in an injection mold, so that a resin part is molded while the molded product is joined to the aluminum alloy component at the same time. Patent literature 1 discloses a technique of injection-joining a polybutylene terephthalate resin (hereinafter referred to as "PBT") to a shaped aluminum alloy with a specific surface treatment. Patent literature 2 discloses a technique of injection-joining a polyphenylene sulfide resin (hereinafter referred to as "PPS") to an aluminum alloy with a specific surface treatment. In the following, the principle of the injection joining in patent literatures 1 and 2 will be briefly described.

(NMT)

The NMT requires two conditions for the aluminum alloy and one condition for the resin composition. The two conditions of the aluminum alloy are described below.

(1) The surface of the aluminum alloy is covered with ultrafine asperities of 20 to 80 nm period or ultrafine recesses or ultrafine protrusions of 20 to 80 nm diameter. As an indicator, it is preferable to be covered with ultrafine asperities having an RSm of 20 to 80 nm. It is also preferable to be covered with ultrafine recesses or ultrafine protrusions having an Rz of 20 to 80 nm. Furthermore, it is also preferable to be covered with ultrafine asperities having an RSm of 20 to 80 nm and an Rz of 20 to 80 nm. RSm represents the mean width of profile elements defined by Japan Industrial Standards (JIS B0601-2001, ISO 4287-1997), and Rz represents the maximum height of a profile defined by Japan Industrial Standards (JIS B0601-2001, ISO 4287-1997).

The aluminum alloy has a surface layer of an aluminum oxide film, having a thickness of 3 nm or more.

(2) Ammonia, hydrazine or water-soluble amine compound is chemically adsorbed on the surface of the aluminum alloy.

On the other hand, the condition of the resin composition is as follows.

(3) The main component is rigid crystalline thermoplastic resin that is capable of reacting with amine compounds in a broad sense at 150° C. to 200° C. such as ammonia, hydrazine and water-soluble amines. Specifically, the resin composition contains PBT, PPS, polyamide resin or the like as the main component.

When the resin composition contained PBT or PPS as the main component (i.e. satisfied the condition of (3)) as well as 10 to 40 mass % of a glass fiber, it exhibited unprecedentedly strong joining strength with an aluminum alloy that satisfied the conditions of (1) and (2). In the condition where the aluminum alloy and resin composition were both plate-shaped and joined to each other in a certain area (0.5 cm$^2$), the shear fracture was 20 to 25 MPa.

To achieve stronger joining strength by the NMT, one more condition is further added for the resin composition.

(4) A different polymer from the main component polymer is contained, and a majority of the different polymer is mixed with the base crystalline thermoplastic resin at the molecular level.

The purpose of adding this condition (4) is to decrease the crystallization rate when molten resin composition is rapidly cooled. This is based on an idea that if a different polymer is mixed at the molecular level, it inhibits the arrangement during crystallization from the molten state, which eventually leads decreasing the crystallization rate in rapid cooling. It was presumed that this enables the resin composition to sufficiently penetrate into the ultrafine asperities before solidified, which contributes to improving the joining strength. This presumption turned out to be true as a result.

When the resin composition contained PBT or PPS as the main component (i.e. satisfied the condition of (3)), satisfied the condition of (4) (was compounded with a different polymer) and further contained 10 to 40 mass % of a glass fiber, it exhibited very strong joining strength with aluminum alloy that satisfied the conditions of (1) and (2). In the condition where the aluminum alloy and resin composition were both plate-shaped and joined to each other in a certain area (0.5 to 0.8 cm$^2$), the shear fracture was 25 to 30 MPa. In the case of a resin composition where different polyamides were compounded, the shear fracture was 20 to 30 MPa.

(New NMT)

With respect to metal alloys besides the aluminum alloy, the present inventors also found the conditions in which such metal alloys can strongly join with thermoplastic resin such as PBT or PPS by injection joining as described in patent literatures 3, 4, 5, 6 and 7. The mechanism of the injection joining in these conditions was named "new NMT". All of these inventions were made by the present inventors. The required conditions of this more widely applicable "new NMT" will be described below. There are conditions for both metal alloy and injection resin. Firstly, the following three conditions ((a), (b) and (c)) are required for the metal alloys.

(a) The first condition is that the metal alloys have such a rough surface by chemical etching that the asperities have a period of 1 to 10 μm and a vertical interval up to approximately a half of the period, i.e. 0.5 to 5 μm. It is however difficult to precisely cover the entire surface with such rough surface by means of a nonuniform and variable chemical reaction. Specifically, it is therefore required that when measured by a roughness meter, the asperities have such a roughness profile as an irregular period in a range of 0.2 to 20 μm and a vertical interval in a range of 0.2 to 5 μm. Alternatively, when the metal alloy surface is scanned with a dynamic mode scanning probe microscope of the latest model, it is deemed that the above condition is substantially satisfied if the surface has such a roughness as an RSm of 0.8 to 10 μm and Rz of 0.2 to 5 μm. Since an idealistic rough surface has an asperity period of approximately 1 to 10 μm as described above, the present inventors named such surfaces "micron-order rough surface" in plain words.

(b) The second condition is that ultrafine asperities having a period of 5 nm or more are further formed on the micron-order rough surface of the metal alloy. In other words, it is required to be an asperate surface through micron-order eyes. In order to satisfy this condition, the above metal alloy surface is subjected to fine etching to form the ultrafine asperities on inner walls of the micron-order rough recesses. The ultrafine asperities have a period of 5 to 500 nm, preferably 10 to 300 nm, more preferably 30 to 100 nm (the optimum value is 50 to 70 nm).

Describing these ultrafine asperities, if the asperity period is less than 10 nm, the resin component clearly has difficulty in penetrating into them. Further, since the vertical interval normally becomes low in such cases, they are considered as a smooth surface for the resin. As a result, they do not function as spikes. If the period is approximately 300 to 500 nm or more (in this case, the micron-order rough recesses are assumed to have a diameter or period of nearly 10 μm), they become less effective since the number of spikes in each micron-order rough recess is drastically decreased. It is thus required that the ultrafine asperities have a period ranging from 10 to 300 nm in principle. However, depending on the shape of the ultrafine asperities, the resin may penetrate into the gaps even if the period is 5 to 10 nm. For example, tangled rod-like crystals having a diameter of 5 to 10 nm fall under the case. Also, even if the period is 300 to 500 nm, the ultrafine asperities of some shapes tend to have anchoring effect. For example, a shape like pearlite structure, which is composed of infinitely continuous steps having a height and depth of tens to 500 nm and a width of hundreds to thousands nm, falls under the case. Including these cases, the required period of the ultrafine asperities is specified to 5 to 500 nm.

With respect to the above first condition, the ranges of the RSm and Rz are conventionally specified to 1 to 10 μm and 0.5 to 5 μm respectively. However, even when the RSm and Rz respectively fall within the ranges of 0.8 to 1 μm and 0.2 to 0.5 μm, the joining strength is retained strong as long as the asperity period of the ultrafine asperities is within a particularly preferable range (approximately 30 to 100 nm). Hence, the range of the RSm was extended lower to a certain extent. Specifically, the RSm and Rz were respectively specified to the ranges of 0.8 to 10 μm and 0.2 to 5 μm.

(c) Furthermore, the third condition is that the metal alloy has a ceramic surface layer. Specifically, as for originally anticorrosive metal alloys, the surface layer is required to be a metal oxide layer having a thickness equal to or more than their natural oxide layer. As for metal alloys having relatively low corrosion resistance (e.g. magnesium alloy, general steels, and the like), the third condition is that the surface layer is metal oxide or metallic phosphate film that is produced by chemical conversion or the like.

On the other hand, the conditions for the resin are described below.

(d) The resin is rigid crystalline thermoplastic resin. Specifically, the resin composition contains PBT, PPS, polyamide resin or the like as a main component.

Furthermore, to achieve strong joining strength, the new NMT requires one more additional condition for the resin composition.

(e) A different polymer from the main component polymer is contained, and a majority of the different polymer is mixed with the base crystalline thermoplastic resin at the molecular level.

The above conditions (d) and (e) are the same as conditions (3) and (4) of the NMT. That is, the optimum injection resin is PBT resin, PPS resin or polyamide resin that is compounded with a different polymer. These resin compositions start generating initial seed crystals late when they are injected to a mold by an injection molding machine and cooled rapidly in the mold to be crystallized and solidified. By means of this property, an attempt was made to make the injection resin reach the bottoms of the micron-order rough recesses. It was presumed that the heads of the flowing resin also penetrated to the recesses of the ultrafine asperities of 5 to 500 nm period that were present on the inner wall of these recesses, and then crystallized and solidified in the state of, so to say, sticking the heads. In practice, when the above resin was injected to different metal alloys that were surface-treated so as to fulfill conditions (a), (b) and (c), the resin was penetrated in the ultrafine asperities, which greatly contributed to the joining strength.

Plate-shaped magnesium alloy, aluminum alloy, copper alloy, titanium alloy, stainless steel, general steel and the like were processed so that their surfaces satisfy conditions (a), (b) and (c). PBT resin or PPS resin was injection-molded into a plate shape on the surfaces. Plate-to-plate joint products were thus obtained. In the condition where these metal alloys and resin compositions are both plate-shaped and they are joined to each other in a certain area (about 0.5 to 0.8 cm$^2$), the shear fracture strengths were 25 to 30 MPa. In these cases, the fracture was caused by destruction at the side of molded resins. Since the new NMT provided very high joining strength and the fracture was thus caused by the destruction at the side of the resin, the joining strengths were on the same level among different metal alloys (patent literatures 3 to 7).

Patent literature 1: WO 03/064150A1 (aluminum alloy)
Patent literature 2: WO 2004/041532A1 (aluminum alloy)
Patent literature 3: WO 2008/069252A1 (magnesium alloy)
Patent literature 4: WO 2008/047811A1 (copper alloy)
Patent literature 5: WO 2008/078714A1 (titanium alloy)
Patent literature 6: WO 2008/081933A1 (stainless steel)
Patent literature 7: WO 2009/011398A1 (general steel)

DISCLOSURE OF THE INVENTION

Problem to be Solved by the Invention

The NMT and new NMT were put into practice by the present inventors, and have already applied in many products. They are currently applied in various parts of electronic equipment. Specifically, parts of cell-phones, notebook computers and projectors are the majority. Currently, the NMT and new NMT are exclusively used for the purpose of firm integration of a metal alloy part with a molded resin (and thus for the purpose of reduction in weight and number of the parts).

Since the NMT and new NMT, which the present inventors developed, enables firm integration of a metal alloy part with a molded resin, they may be applicable for gas-sealing gaps between a metal part and a resin. For example, they may be applicable for sealing electrodes of capacitors or sealing outlet electrodes of lithium-ion secondary batteries. Lithium-ion secondary batteries use non-aqueous electrolyte, and include outlet electrodes that are composed of aluminum for the positive electrode and copper for the negative electrode. Since penetration of water is absolutely unacceptable for this electrolyte, it is essential to be sealed against gas including moisture. This is because penetration of water is considered to cause degradation of the battery performance and battery life. Currently, outlet electrodes of lithium-ion batteries are sealed with O-rings.

However, high joining strength between a metal alloy part and a molded resin is not directly linked to improvement of the sealing properties. This is also evident from the experimental results described below. It is thus uncertain whether superior gas sealing properties are exerted or not compared to the O-ring that is used in lithium-ion secondary batteries. However, if the NMT and new NMT or an improved technique based on these joining techniques provided good gas sealing properties, it would be possible to provide totally novel solving means with respect to gas sealing methods of lithium-ion batteries and the like. The present invention was made in view of such technological backgrounds, and an object thereof is to provide a metal-resin composite that has high gas sealing properties while achieving firm metal-resin joining, and to provide a method for manufacturing the same.

Means for Solving the Problem

The present inventors compared the gas sealing performance by a conventional technique (sealing with an O-ring) with those by the NMT and new NMT, and found that the NMT provided the best gas sealing properties. As shown in table 1 below, the amount of gas leakage was reduced to approximately one hundredth by means of the NMT and approximately one fifth by means of the new NMT when compared to the conventional tightening with an O-ring. The difference in gas sealing properties between the NMT and new NMT will be described with reference to FIGS. 1 and 2.

(NMT)

Figure 1:
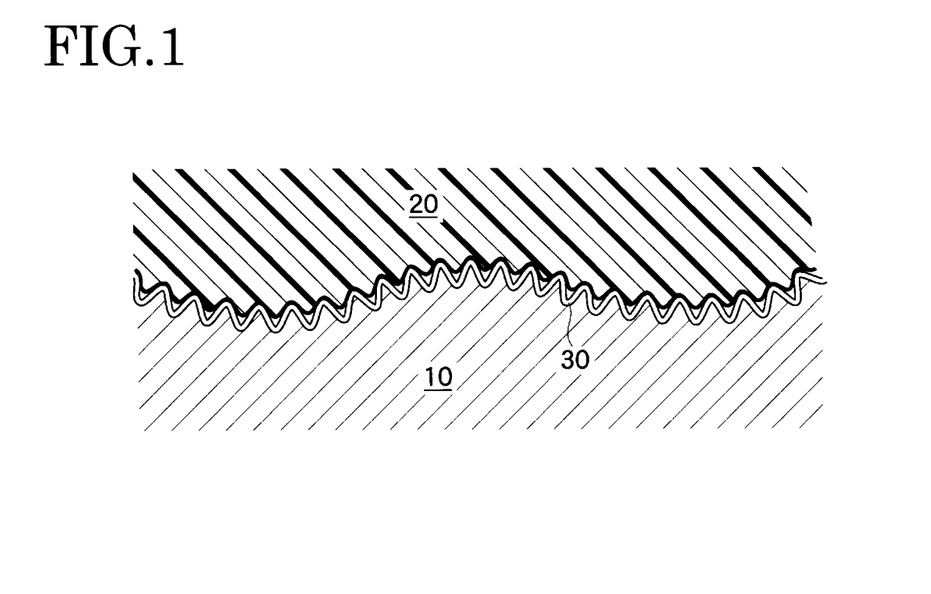
FIG. 1 is a view showing a joining part of an aluminum alloy and resin by the NMT.

In an example of the NMT shown in FIG. 1, a resin is penetrated in the ultrafine recesses of 20 to 80 nm diameter that are formed on the surface of an aluminum alloy phase 10. The ultrafine recesses are covered with an aluminum oxide film 30 having a thickness of 3 nm or more. An aluminum alloy with such surface structure is inserted into an injection mold, and molten thermoplastic resin is injected under high pressure. At this moment, the thermoplastic resin meets amine compound molecules adsorbed on the aluminum alloy surface to cause a chemical reaction. This chemical reaction suppresses a physical reaction that the thermoplastic resin crystallizes and solidifies when it is cooled rapidly by contacting with the aluminum alloy that is kept at low mold temperature. As a result, this retards crystallization and solidification of the resin, and the resin penetrates into the ultrafine recesses on the aluminum alloy surface in that time. After the penetration, the resin is crystallized and solidified so as to join with the hard aluminum oxide thin layer 30. Because of this anchoring effect, the thermoplastic resin becomes resistant to peeling off from the aluminum alloy surface even when subjected to an external force. That is, the aluminum alloy is joined firmly with the formed molded resin. In practice, PBT and PPS, which are capable of chemically reacting with amine compounds, are confirmed to be applicable for injection joining with this aluminum alloy.

Although the NMT is disclosed in patent literatures 1 and 2, the summary thereof will be described. A shaped aluminum alloy part is put in a degreasing bath and treated with a degreasing process. It is subsequently immersed in several-% solution of sodium hydroxide to dissolve the surface, so as to remove residual contaminants that are left after the degreasing process together with the aluminum surface. It is subsequently immersed in several-% solution of nitric acid so as to neutralize and remove sodium ions or the like that are attached on the surface as a result of the previous step. These above processes are to make the surface of the aluminum alloy part clean and stable in a structural and chemical sense, so to say face-wash before putting on makeup. If the aluminum alloy part is so clean as to have no contamination or corrosion at all, these pretreatment processes can be omitted.

The following is an important treatment of the NMT. In the NMT, the aluminum alloy is immersed in aqueous solution of water-soluble amine compound in a proper condition so as to etch the alloy surface to form the ultrafine asperities of 20 to 80 nm period as well as to let the amine compound chemically adsorbed there simultaneously. The present inventors conducted an experiment in which aluminum alloys with surface treatment of different conditions were each inserted in an injection mold, and the PBT resin or PPS resin for the NMT was injection-joined thereto. Thus, they found a condition in which the joining strength reaches the maximum value while the immersion time of the surface treatment is 1 to 2 min. This condition has been used as the optimum production method. More specifically, hydrazine monohydrate was the water-soluble amine compound that was used for the surface treatment of the aluminum alloys, the surface treatment was performed with different conditions (concentration, solution temperature and immersion time) and the joining strengths between aluminum alloys and thermoplastic resin were measured. The optimum concentration, solution temperature and immersion time were thus determined.

For example, an aluminum alloy part is immersed in several-% solution of hydrazine hydrate at 45° C. to 65° C. for 1 to several min so as to form the ultrafine asperate surface of 20 to 40 nm period by ultrafine etching. By this immersion treatment in hydrazine hydrate solution, the entire face of the aluminum alloy part is corrosively etched due to weak basicity of the solution while generating hydrogen gas. By adjusting the temperature, concentration and immersion time, the aluminum alloy surface is covered with the ultrafine asperity of 20 to 40 nm period. After the ultrafine etching, the aluminum alloy part is washed well with ion-exchanged water, and dried at 50° C. to 70° C. The aluminum alloy is thus processed to be suitable for the injection joining, which has chemically adsorbed hydrazine. This is the surface treatment of the "NMT".

(New NMT)

Figure 2:
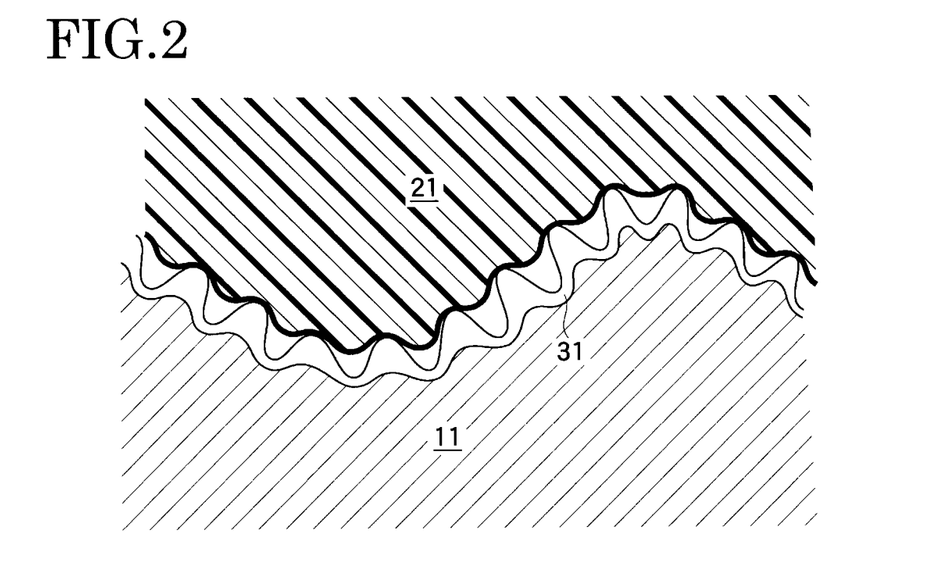
FIG. 2 is a view showing a joining part of a metal alloy and resin by the new NMT.

Also in an example of the new NMT shown in FIG. 2, a resin phase 21 is penetrated in the ultrafine asperities that are formed on the surface of a metal alloy phase 11. The ultrafine recesses are covered with a film 31 of metal oxide or metallic phosphate. Comparing to the NMT, the resin was penetrated in the ultrafine asperities (approximately 50 to 100 nm diameter in this example) less deeply. This is probably because there is no chemical reaction of the thermoplastic resin with amine compound molecules, and crystallization and solidification of the resin cannot be retarded as much as the case of the NMT. That is, the NMT is better in terms of the degree of resin penetration to the ultrafine asperities having a diameter of tens of nm, and is accordingly considered better also in terms of the gas sealing properties.

(NMT 2)

By improving the NMT, the present inventors developed an injection joining technique that provides further better gas sealing properties. This technique is named "NMT 2". By means of the NMT, unprecedentedly strong joining can be established between an aluminum alloy and resin composition. However, the optimum conditions for joining strength are not always the optimum conditions for gas sealing properties. This improvement is to increase the amount of the adsorbed amine compound while the diameter of the ultrafine asperities is kept approximately 20 to 80 nm. That is, while the shape of the ultrafine asperities is left undeformed in order to keep the maximum level of the joining strength, more amount of the amine compound (e.g. hydrazine) is adsorbed than in the case of the NMT so as to further retard crystallization and solidification of the thermoplastic resin and thus to increase the degree of penetration to the ultrafine asperities.

The present inventors improved the treatment process from this aspect. Firstly, the ultrafine asperities were formed onto an aluminum alloy surface by ultrafine etching in the same condition as the NMT. Thereafter, it is subjected to a treatment process of increasing the amount of the amine compound chemisorption, where it is immersed in aqueous solution of a water-soluble amine compound that is more diluted and has lower temperature than one used in the NMT. For a specific example, the ultrafine recesses of 20 to 40 nm diameter are firstly formed on the surface by immersion in several-% solution of hydrazine hydrate at 45° C. to 65° C. for 1 to several min so (the same treatment as in the NMT). In this immersion treatment in the hydrazine hydrate solution, the entire face of the aluminum alloy is corrosively etched due to weak basicity of the solution while generating hydrogen gas. By adjusting the temperature, concentration and immersion time, the entire face is covered with the ultrafine asperities of 20 to 40 nm period.

In the NMT 2, after the above etching treatment (the same treatment as in the NMT), the aluminum alloy is immersed in 0.05 to 1% aqueous solution of an amine compound (e.g. hydrazine hydrate aqueous solution) at 15° C. to 45° C. for 1 to 10 min, and then washed with water and dried at a low temperature of 50° C. to 70° C. The purpose thereof is to promote only the chemisorption of the amine compound (e.g. hydrazine) while moderating the etching by use of the low-concentration aqueous solution of the water-soluble amine compound (e.g. hydrazine hydrate aqueous solution). Further, the drying condition after washing with water is set as low as 50° C. to 70° C. This low temperature drying is not intended to prevent the aluminum alloy surface from hydroxylation, but is a result of searching for the optimum temperature for fixing the adsorbed amine compound (e.g. hydrazine) as a chemisorption substance. The NMT may employ ammonia or water-soluble amine besides hydrazine for the surface treatment of the aluminum alloy, so may the NMT 2. In the experimental examples described below, it was confirmed that the surface treatment of the NMT 2 can be performed by used of any of hydrazine hydrate aqueous solution, alkyl amine aqueous solution and ethanol amine aqueous solution.

Figure 3:
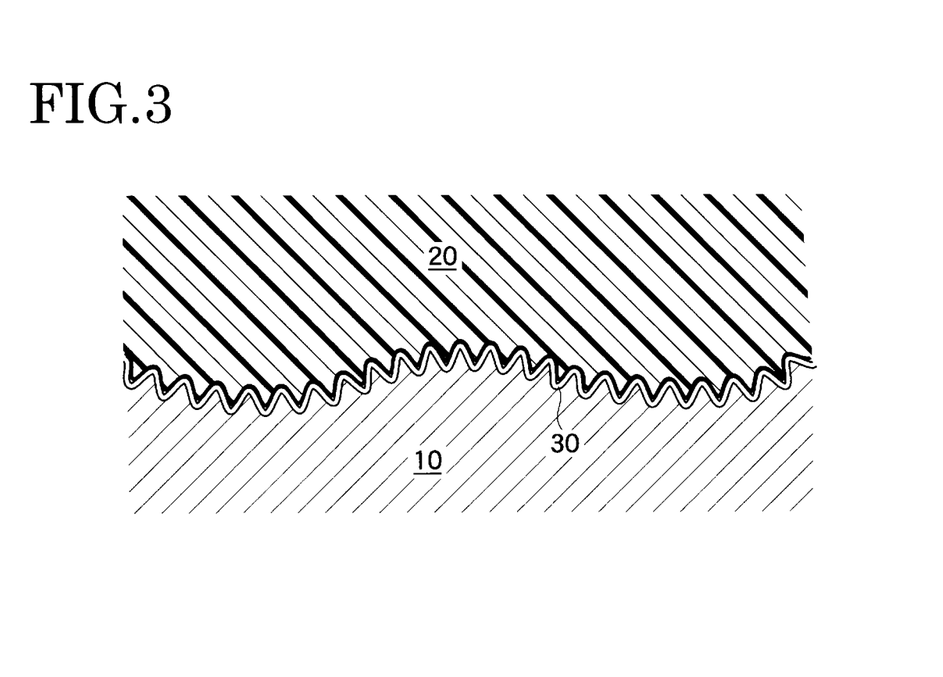
FIG. 3 is a view showing a joining part of an aluminum alloy and resin by the NMT 2.

By the second immersion to the water-soluble amine compound solution, it was presumed that the amount of amine compound chemisorption can be increased while the etching rate is greatly decreased. An experiment was therefore conducted, and good results were obtained. The joining strength of the injection joining was not decreased, while the gas sealing properties were greatly improved compared to the NMT. The thermoplastic resin that is injected on the aluminum alloy surface is almost completely penetrated to the bottoms of the ultrafine recesses of 20 to 40 nm diameter. As shown in FIG. 3, it is considered that there is little gap left between the thermoplastic resin and aluminum oxide film on the surface of the aluminum alloy phase. This is probably the reason the gas sealing properties are greatly improved in the NMT 2 compared to the NMT.

The reason the joining strength stays unchanged between the conventional NMT and NMT 2 is that the resin part fractures in either case when subjected to a strong external force. That is, most of the penetrated resin is left inside the ultrafine asperities even after fracture, and the fracture is due to the destruction of the resin material itself. Therefore, the joining strengths are the same. As described above, the injection joining technique of the NMT 2 is completely the same as that of the "NMT" in the point that an integrated product of aluminum alloy/molded resin is obtained by giving a specific surface treatment to an aluminum alloy, inserting it to an injection mold, injecting improved thermoplastic resin, and releasing it from the die. However, the gas sealing properties thereof are apparently higher than that of the NMT.

A composite obtained by the NMT 2 has no difference from one by the NMT except for the gas sealing properties. Their shear fracture strengths and tensile fracture strengths are both approximately 25 to 30 MPa, which are the same as those of the molded resin. No difference is observed under an electron microscope between an aluminum alloy material with the surface treatment for the NMT and one with the surface treatment for the NMT 2. It is also difficult to identify the difference between the NMT and NMT 2 when the joining part of an aluminum alloy piece of each composite is sliced into 50 nm thick and observed under a transmission analytical electron microscope. Therefore, employed is such a method that the structures as described below were prepared, and the gas sealing properties were measured over several days to 1 week or more.

Another means is to analyze a surface-treated aluminum alloy piece by XPS. However, it is difficult to identify whether the surface treatment is the one for the NMT or the one for the NMT 2 from one sample. XPS is an analytical technique that detects signals of almost all atoms present from the sample surface to a depth of several nm. The proportion of hydrazine molecules is thus low even if they are adsorbed on the entire face. This is because chemisorption is composed of only a single molecule layer, and the signal derived from the nitrogen atoms of the hydrazine molecules is thus very small. Therefore, whether an NMT-treated sample or NMT 2-treated sample, it is required to integrate at least 5 or more irradiation data to distinguish a peak from noise signals in order to identify the presence of the nitrogen atoms by XPS. On the other hand, repetitive X-ray irradiation damages the sample, and the chemically adsorbed hydrazine gradually decreases by the repetitive irradiation. Integrating a greater number data is thus not always better, and the integration of approximately 15 data is the limit. As a result, XPS is difficult to use for quantitative analysis of the adsorbed hydrazine, but it is rather used for qualitative analysis. However, if an NMT-treated sample and NMT 2-treated sample are successively subjected to an XPS analysis in the same condition on the same day, the latter sample apparently has a larger nitrogen atom peak.

[Resin Composition Used in NMT 2]

The NMT 2 can employ the resin compositions that are used in the NMT. That is, a resin composition including PBT, PPS, polyamide resin or the like may be used. A PPS resin is taken as an example here. For the NMT, several types of PPS resins are commercially available from three companies. "SGX 120 (Tosoh Corp.)" is one of the PPS resins for the NMT. This can also be used for the NMT 2. Details of the resin compositions are described in patent literature 3, which will be quoted here. The PPS resin composition for the NMT is a composition whose resin component includes 70% to 97% of PPS and 30% to 3% of modified polyolefin resin. It is preferable to additionally contain a component that promotes compatibilization between them. Besides the resin component, a filler and the like are contained.

Preferable examples of the modified polyolefin resin include maleic anhydride-modified ethylene copolymers, glycidyl methacrylate-modified ethylene copolymers, glycidyl ether-modified ethylene copolymers, ethylene-alkylacrylate copolymers and the like. The maleic anhydride-modified ethylene copolymers include, for example, maleic acid graft-modified polyethylene, maleic anhydride-ethylene copolymer, ethylene-acrylate-maleic anhydride terpolymer and the like, of which ethylene-acrylate-maleic anhydride terpolymer is preferable since particularly good composites are obtained therefrom. Specific examples of the ethylene-acrylic ester-maleic anhydride terpolymer include "BONDINE (Arkema Corp.)" and the like.

The glycidyl methacrylate-modified ethylene copolymers include glycidyl methacrylate graft-modified polyethylene, glycidyl methacrylate-ethylene copolymer and the like, of which glycidyl methacrylate-ethylene copolymer is preferable since particularly good composites are obtained therefrom. Specific examples of the glycidyl methacrylate-ethylene copolymer include "BONDFAST (Sumitomo Chemical Co., Ltd.)" and the like.

The glycidyl ether-modified ethylene copolymers include, for example, glycidyl ether graft-modified ethylene copolymer, glycidyl ether-ethylene copolymer and the like. Specific examples of the ethylene-alkylacrylate copolymers include "LOTRYL (Arkema Corp.)" and the like. Further, the ethylene-alkylacrylate copolymers include ethylene-alkylacrylate copolymers, ethylene-alkylmethacrylate copolymers and the like, which are preferably used.

It is preferable to blend 0.1 to 6 parts by mass of a polyfunctional isocyanate compound and/or 1 to 25 parts by mass of an epoxy resin with 100 parts by mass of the above resin component, since the mixing property (mixing property at the molecular level) in an extruder is improved. The polyfunctional isocyanate compound may be of commercially available non-block type or block type. Examples of the non-block type polyfunctional isocyanate compound include, for example, 4,4'-diphenylmethane diisocyanate, 4,4'-diphenylpropane diisocyanate, toluene diisocyanate, phenylene diisocyanate bis(4-isocyanatephenyl)sulfone and the like. The block-type polyfunctional isocyanate compound includes two or more isocyanate groups in the molecule that are reacted with a volatile active hydrogen compound to be inactive at ordinary temperature. Although the type of the block-type polyfunctional isocyanate compound is not particularly specified, it generally includes isocyanate groups that are masked with a blocking agent such as alcohols, phenols, ε-caprolactam, oximes or active methylene compounds. Examples of the block-type polyfunctional isocyanate compound include, for example, "TAKENATE (Mitsui-Takeda Chemicals, Inc.)" and the like.

The epoxy resin may be an epoxy resin that is generally known as bisphenol A type, cresol novolac type or the like. Examples of the bisphenol A type epoxy resin include, for example, "EPIKOTE (Japan Epoxy Resin Corp.)" and the like, and Examples of the cresol novolac type epoxy resin include "EPICLON (Dainippon Ink and Chemicals Corp.)" and the like.

Examples of the filler include reinforcement fibers, powder fillers and the like. The reinforcement fibers include glass fibers, carbon fibers, aramid fibers and the like, and specific examples of the glass fibers include a chopped strand having an average fiber size of 6 to 14 μm. Further, the powder fillers include, for example, calcium carbonate, mica, glass flake, glass balloons, magnesium carbonate, silica, talc, clay, ground products of carbon fiber or aramid fiber, and the like. These fillers are preferably treated with a silane coupling agent or titanate coupling agent. The filler content is 0% to 60%, preferably 20 to 40% of the final resin composition.

(Injection Joining Process)

An aluminum alloy part with the NMT 2 treatment is inserted into an injection mold, and the PPS resin is injected thereto. The injection condition is the same as that of ordinary PPS resin. It is a common object of the NMT and NMT 2 to produce strong joining strength by pushing the resin into the ultrafine recesses on the ultrafine asperate surface of the aluminum alloy part. Hence, gas bubbles, gas burn or the like is strictly unacceptable, and gas venting of the mold is essential. Although gas venting tends to cause thin flashes, it is preferable in the NMT 2 to inject steadily to the extent that thin flashes occur. That is, the injection molding conditions should not be determined only for achieving beautiful appearance of molded products. The object is to improve the sealing properties by steady injection joining. If the occurrence of thin flashes is problematic, such thin flashes should be removed in a post-processing step.

Advantageous Effect of the Invention

The composite of the aluminum alloy and resin composition that is manufactured by the "NMT 2" is so integrated as not to easily separate from each other as well as has excellent gas sealing properties. This "NMT 2" is an improved technique of the "NMT". The composite has by far better gas sealing properties than an injection-joining product of aluminum alloy and thermoplastic resin by the conventional "NMT", or has almost perfect sealing performance. There is substantially no gap at the joining boundary between the aluminum alloy and molded resin, and gas molecules hardly come through the joining boundary.

Hence, if the NMT 2 is applied to the manufacture of outlet electrode lids of capacitors and batteries using non-aqueous electrolyte, the gas sealing properties from the outside can be improved to the highest level. In particular, penetration of water can be prevented. With respect to lithium-ion batteries, the battery life can be extended since if water molecules are penetrated into the non-aqueous electrolyte from the outside, it is considered to cause deterioration of the performance and decrease in battery capacity and charging rate. By applying the NMT 2 to the manufacture of electrode sealings of capacitors and lithium-ion batteries, which are expected to acquire great demand in the future, the durability of such batteries can be greatly improved.

BEST MODE FOR CARRYING OUT THE INVENTION

Hereinafter, the best mode for carrying out the invention will be described based on experimental examples. In the following experimental examples, an O-ring gas sealing properties test, an NMT gas sealing properties test, a new NMT gas sealing properties test and an NMT 2 gas sealing properties test were conducted. A structure 40a was used in the O-ring gas sealing properties test, a structure 40b was used in the NMT gas sealing properties test, a structure 40c was used in the new NMT gas sealing properties test, and a structure 40d was used in the NMT 2 gas sealing properties test.

Figure 4:
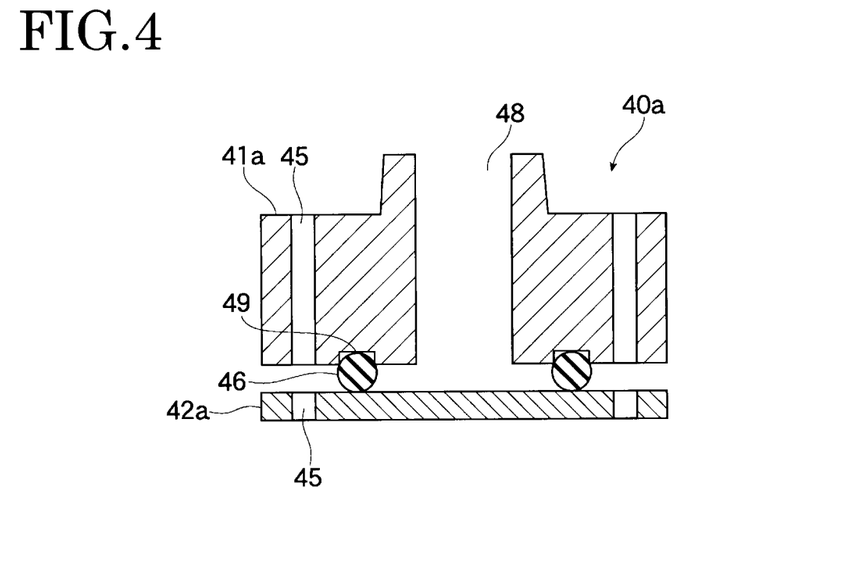
FIG. 4 is a cross-sectional view of a structure in which a gap between aluminum alloy parts is sealed with an O-ring.

The structure 40a that was used for the O-ring gas sealing is shown in FIG. 4. The structure 40a includes a body 41a of A5052 aluminum alloy, a bottom 42a of A5052 aluminum alloy and a commercially available rubber O-ring 46. The body 41a has an approximately cylindrical shape, and is provided with a hole 48 in the center as shown in the cross-sectional view of FIG. 4. A wall surrounding the upper part of the hole 48 has larger outer diameter than a wall surrounding the lower part of the hole 48. That is, the wall surrounding the upper part of the hole 48 is thinner, and the body 41a has a stepwise cross section. A gap between the bottom 42a and body 41a is sealed with the O-ring 46 that is engaged with a groove 49. The O-ring has an outer diameter of 25 mm, inner diameter of 19 mm and cross section of 3 mm φ. Bolt holes 45 are provided at the vicinity of the side walls of the body 41a and bottom 42a respectively. In a condition where the O-ring 46 is engaged with the groove 49 of the body 41a as well as the lower end of the O-ring is in contact with the bottom 42a, bolts are inserted through both bolt holes 45 on the body 41a and bottom 42a, and are tightened by nuts from the upper face of the body 41a and the bottom face of the bottom 42a. Thus, the body 41a, O-ring 46 and bottom 42a are integrated with each other.

Figure 5:
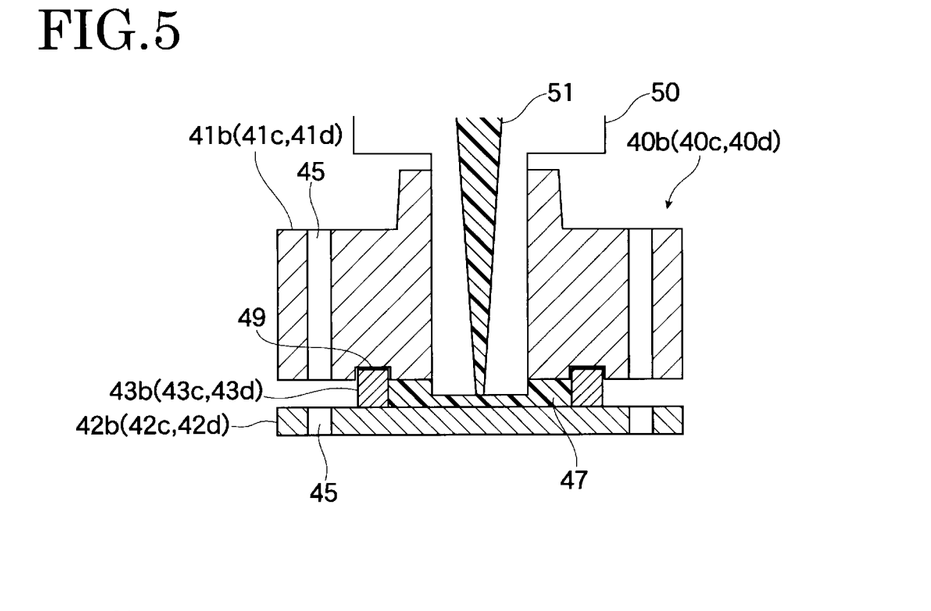
FIG. 5 is a cross-sectional view of a structure in which a gap between metal parts is sealed with a PPS resin.
Figure 6:
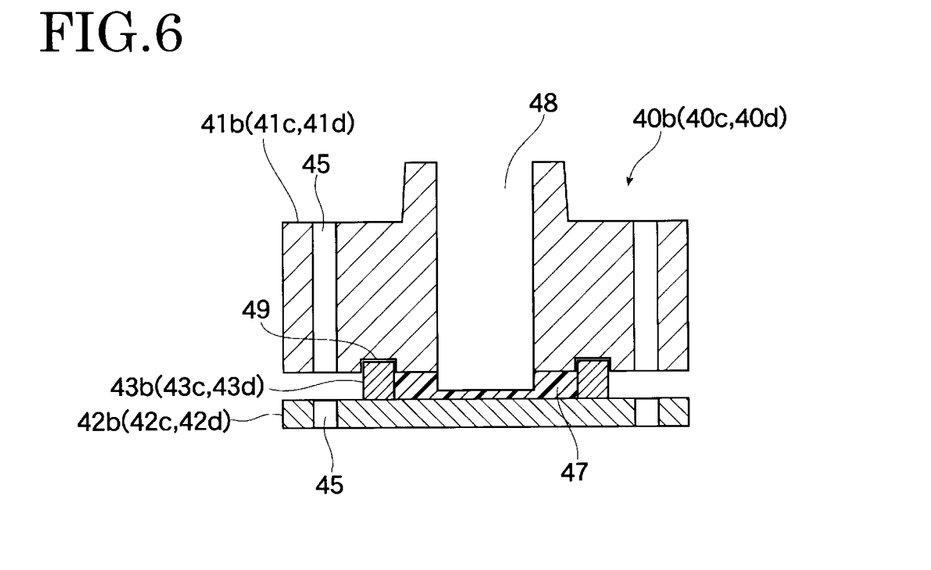
FIG. 6 is a cross-sectional view of a structure in which a gap between metal parts is sealed with a PPS resin.

FIGS. 5 and 6 show the structure 40b that was used in the NMT gas sealing test. A body 41b is the same as the body 41a of the structure 40a in terms of the shape and material, but is treated with the surface treatment of the NMT. Also, a bottom 42b is the same as the bottom 42a of the structure 40a in terms of the shape and material, but is treated with the surface treatment of the NMT. The structure 40b does not include an O-ring, but a metal ring 43b having a rectangular cross section is engaged with the groove 49. This metal ring 43b is also made of A5052 aluminum alloy as with 41b and 42b, and treated with the surface treatment of the NMT. A resin member 47 seals a gap between the body 41b and metal ring 43b and a gap between the metal ring 43b and bottom 42b.

A method for manufacturing the structure 40b will be shown. As shown in FIG. 5, the metal ring 43b is engaged to the groove 49, the bottom 42b is made contact with the bottom face of the metal ring 43b, they are inserted into an injection mold, and an in-mold protrusion 50 is fitted into the hole 48. A pin gate 51 is carved in the in-mold protrusion 50. Here, the pin gate 51 is located midway between the upper face of the bottom 42b and the bottom face of the body 41b. With this state, the resin composition is injected from the pin gate 51 to form a resin member 47 that joins to the upper face of the bottom 42b, bottom face of the body 41b and inner periphery of the metal ring 43b one another. After the injection molding, the structure 40b as shown in FIG. 6 is obtained.

Figure 7:
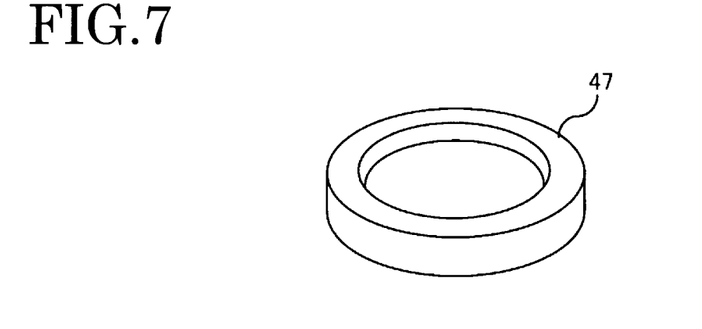
FIG. 7 is a perspective view of a PPS molded resin.

FIG. 7 shows a perspective view of the resin member 47. The resin member 47 is an injection-molded product having a dish shape with a shallow center. The resin member 47 has an inner diameter of 15 mm, outer diameter of 19 mm and rim width of 2 mm. The center recess coincides with the hole 48 to form a cavity inside the structure. The upper, side and bottom faces of the rim of the resin member 47 are respectively joined to the lower face of the body 41b, side face of the metal ring 43b and upper face of the bottom 42b. The upper face (rim) of the resin member 47 is directly related to gas sealing. The amount of gas permeation is considered to be proportional to the inner circumference (15 mm×3.14=4.71 cm) of this face, as well as to be inversely proportional to the width between the inner and outer peripheries (width of the rim, 0.2 cm).

The structure 40c, which is used in the new NMT gas sealing test, has the same shape as the structure 40b. However, a body 41c of the structure 40c is made of different metal alloy (copper alloy in the present example) with the surface treatment of the new NMT. A bottom 42c and metal ring 43c are both made of A5052 aluminum alloy with the surface treatment of the NMT.

FIGS. 5 and 6 show the structure 40d that was used in the NMT 2 gas sealing test. A body 41d has the same shape and material as the body 41a of the structure 40a, but is treated with the surface treatment of the NMT 2. In the experimental example described below, a body 41b made of aluminum alloy A1050 was also prepared. This body was also treated with the surface treatment of the NMT 2. As for a bottom 42d and metal ring 43d, they are made of A5052 aluminum alloy as with 42b and 43b, and are treated with the surface treatment of the NMT. A resin member 47 seals a gap between the body 41d and metal ring 43d and a gap between the metal ring 43d and bottom 42d.

(Measuring Arrangement of Sealing Properties)

Figure 8:
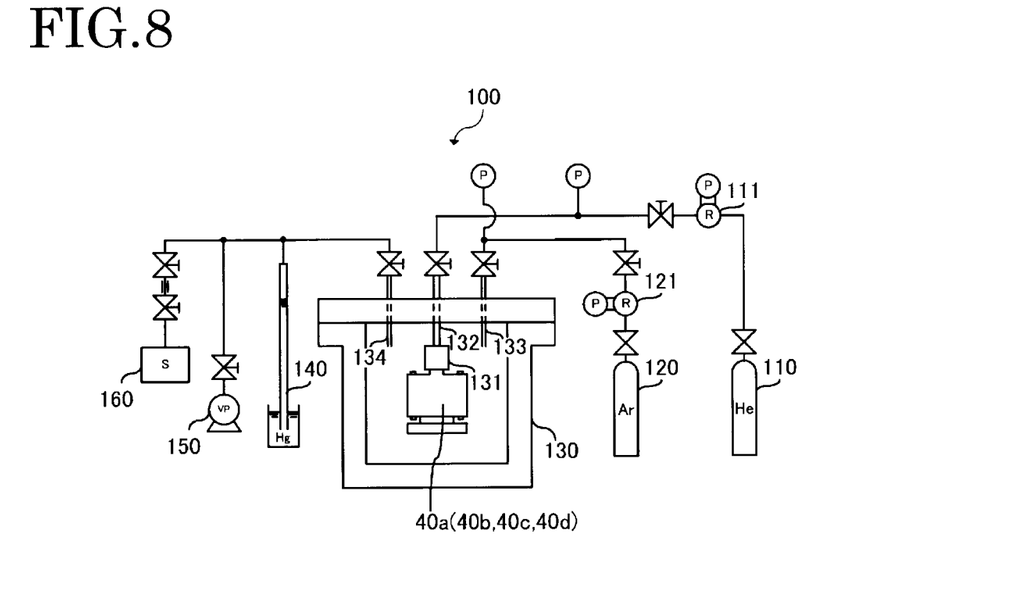
FIG. 8 is schematic diagram of a testing arrangement for a gas sealing properties test.

FIG. 8 shows an overview of a gas sealing properties experimental arrangement 100. The gas sealing properties experimental arrangement 100 is a measuring arrangement for measuring gas sealing properties of the above-described structures 40a, 40b, 40c and 40d. As shown in FIG. 8, the gas sealing properties experimental arrangement 100 includes a helium cylinder 110 and a regulator 111 with a pressure gauge connected thereto, an argon cylinder 120 and a regulator 121 with a pressure gauge connected thereto, an autoclave 130, a Swagelok pipe joint 131, a mercury column vacuum meter 140, a vacuum pump 150, a sampling container 160 and the like.

From the outside into the autoclave 130, as shown in FIG. 8, a pipe 132 connected to the helium cylinder 110 is inserted, a pipe 133 connected to the argon cylinder 120 is inserted, and a pipe 134 connected to the vacuum meter 140, vacuum pump 150 and sampling container 160 is inserted. At the time of measurement, the structures 40a, 40b, 40c and 40d are each placed inside the autoclave 130, a center upper end (protrusion) of the structure is connected with the pipe 132 by the pipe joint 131, and a hatch is closed to put the inside of the autoclave 130 into a sealed condition.

At the time of measurement, the cavity (hole 48) inside the structure is pressurized to an absolute pressure of 0.61 MPa by the helium cylinder 110 through the regulator 111 and pipe 132. Control is given to keep the helium pressure at 0.61 MPa until the end of measurement. Meanwhile, the inside of the autoclave 130 is filled with argon at an absolute pressure of 0.11 MPa (slightly higher than ordinary pressure) by the argon cylinder 120 through regulator 121. The pressure difference between the inside of the structure and inside of the autoclave 130 is eventually 0.5 MPa.

At the beginning of the test, the inside of the autoclave is depressurized by the vacuum pump 150 while checking the vacuum pump 140, so as to create 100% argon atmosphere inside the autoclave. After 72 hours, the sampling container 160 and the inlet pipe thereof is vacuumed by the vacuum pump 150, and approximately 30 cc of gas is corrected from the inside of the autoclave to the sampling container 160. The gas in the sampling container is then subjected to analysis so as to measure the amount of helium leakage into argon. That is, the cavity of the structure is filled with high pressure helium at approximately 6 atm while the inside of the autoclave under argon atmosphere at approximately ordinary pressure (1 atm). A pressure difference of 0.5 MPa is thus created so as to let the helium leak out from the cavity of the structure to the inside of the autoclave. After a lapse of predetermined time, the gas inside the autoclave is sampled and the amount of helium leakage is measured by gas analysis.

The present inventors calculated the helium leakage rate from the amount of helium leakage in this way. The leakage rate is a value obtained by dividing the amount of helium leakage by the testing time (table 1). However, when X ml/h of gas is leaked per unit time from the structure 40a with an O-ring due to the pressure difference, the value (X/6.91) ml/cmh obtained by dividing this value with the circumferential length 6.91 cm of the center diameter 22 mm of the O-ring is a suitable value that indicates the amount of leakage per unit length per unit time (i.e. leakage rate). As for the structures 40b, 40c and 40d by injection joining, when X ml/h of gas is leaked due to the pressure difference, the value (0.2X/4.71) ml/h obtained by dividing this value with the circumferential length 4.71 cm of the inner diameter 15 mm of the resin member 47 and further multiplying by the gas flow path 0.2 cm is a suitable value that indicates the amount of leakage per unit time (i.e. leakage rate). The structure 40a with an O-ring is different from the structures 40b, 40c and 40d by the injection joining in shape and sealing technique. However, the overall shapes are similar and a rough comparison can be made based on the above values.

EXPERIMENTAL EXAMPLES

Hereinafter, a measuring method of gas sealing properties by the NMT, new NMT or MNT of the present invention will be described with reference to experimental examples. The following equipment was used for the experiments.
(1) Electron Microscopic Observation An electron microscope was mainly used for observation of aluminum alloy surfaces. This electron microscope was a scanning electron microscope (SEM) "JSM-6700F (JEOL Ltd.)", and operated at 1 to 2 kV for the observation.
(2) X-Ray Photoelectron Spectroscopy (XPS Observation)

An X-ray photoelectron spectroscopic analyzer (XPS observation) was used, where a sample is irradiated with X-ray and the energy of photoelectrons that are emitted from the sample is analyzed to perform qualitative analysis of elements and the like. Qualitative analysis by XPS was conducted with respect to nitrogen atoms on aluminum alloys, and presence of chemically adsorbed hydrazine was confirmed. An XPS "AXIS-Nova (Kratos Analytical Ltd., Shimadzu Corp.)" was used in the experiments.
(3) Measurement of Joining Strength of Composite A composite 50 shown in FIG. 9 was prepared in order to measure the joining strength of a composite of a metal alloy and resin composition. The composite 50 has a structure that a metal alloy plate 51 is joined with a molded resin 53 by injection joining and a joining part 52 has an area of 0.5 cm². As the joining strength of this composite 50, the tensile stress was measured. Specifically, the composite 50 was pulled by a tensile tester to apply shear force, and the fracture strength at which the composite 50 ruptures was measured. A tensile tester "AG-10kNX (Shimadzu Corp.)" was used, and shear fracture was caused at a tensile rate of 10 mm/min.
(4) Gas Analyzer Used in the Sealing Properties Measuring Arrangement For quantitative analysis of the helium concentration in the argon and the like, a quadrupole mass spectrometer "JMS-Q1000GC (JEOL Ltd.)" was used.

Experimental Example 1

Preparation of A5052 Aluminum Alloy Parts (NMT 2)

To prepare the structure 40d shown in FIG. 5, A5052 aluminum alloy parts of the body 41d, bottom 42d and metal ring 43d were prepared. The body 41d was treated with the surface treatment of the NMT 2. In contrast, the bottom 42d and metal ring 43d were treated with the surface treatment of the NMT. The surface treatment of the NMT 2 was performed as follows. First, aqueous solution (solution temperature of 60° C.) containing 7.5% of an aluminum degreasing agent "NE-6 (Meltex Inc.)" was prepared as degreasing solution, and a degreasing bath with the degreasing solution was prepared. The A5052 aluminum alloy part (a shaped part to be the body 41d by the treatment) was immersed therein for 5 min, and then washed with tap water (Ota-city, Gunma). Subsequently, aqueous solution (40° C.) containing 1% hydrochloric acid was prepared in another tub, so as to prepare an acid pre-cleaning bath. The part was immersed in this acid pre-cleaning bath for 1 min, and then washed with ion exchanged water.

Subsequently, aqueous solution (solution temperature of 40° C.) containing 1.5% sodium hydroxide was prepared in another tub, so as to prepare an etching bath. The part was immersed in this etching bath for 1 min, and then washed with ion-exchanged water. Subsequently, 3% aqueous solution of nitric acid (40° C.) was prepared in another tub, so as to prepare a neutralizing bath. The part was immersed in this neutralizing bath for 1 min, and then washed with ion-exchanged water. Subsequently, aqueous solution (60° C.) containing 3.5% hydrazine hydrate was prepared in another tub, so as to prepare an NMT first treatment bath. The part was immersed in this NMT first treatment bath for 1 min. Subsequently, aqueous solution (40° C.) containing 0.5% hydrazine hydrate was prepared in another tub, so as to prepare an NMT second treatment bath. The part was immersed in this NMT second treatment bath for 3 min, and then washed with ion exchanged water. Subsequently, the part was left in a hot air dryer at 55° C. for 40 min to dry it. The obtained part was closely wrapped with aluminum foil and further sealed in a plastic bag for storage.

The surface of the A5052 aluminum alloy with the above treatment was observed under an electron microscope. The surface was covered with countless ultrafine recesses, and these recesses had 20 to 40 nm diameter. Further, presence of nitrogen was confirmed by XPS observation.

On the other hand, the bottom 42d and metal ring 43d were treated with the surface treatment of the NMT. The process of this treatment was completely as same as the surface treatment of the NMT described in experimental example 2 below.

Experimental Example 2

Preparation of A5052 Aluminum Alloy Part (NMT)

To prepare the structure 40b shown in FIG. 5, A5052 aluminum alloy parts of the body 41b, bottom 42b and metal ring 43b were prepared. The body 41b, bottom 42b and metal ring 43b were treated with the surface treatment of the NMT. The surface treatment of the NMT was performed as follows. First, aqueous solution (solution temperature of 60° C.) containing 7.5% of the aluminum degreasing agent "NE-6" was prepared as degreasing solution, and a degreasing bath with the degreasing solution was prepared. The A5052 aluminum alloy parts (shaped parts to be the body 41b, bottom 42b and metal ring 43b by the treatment) were immersed therein for 5 min, and then washed with tap water (Ota-city, Gunma). Subsequently, aqueous solution (40° C.) containing 1% hydrochloric acid was prepared in another tub, so as to prepare an acid pre-cleaning bath. The parts were immersed in this acid pre-cleaning bath for 1 min, and then washed with ion exchanged water.

Subsequently, aqueous solution (solution temperature of 40° C.) containing 1.5% sodium hydroxide was prepared in another tub, so as to prepare an etching bath. The parts were immersed in this etching bath for 1 min, and then washed with ion-exchanged water. Subsequently, 3% aqueous solution of nitric acid (40° C.) was prepared in another tub, so as to prepare a neutralizing bath. The parts were immersed in this neutralizing bath for 1 min, and then washed with ion-exchanged water. Subsequently, aqueous solution (60° C.) containing 3.5% hydrazine hydrate was prepared in another tub, so as to prepare an NMT treatment bath. The parts were immersed in this NMT treatment bath for 1 min, and then washed with ion exchanged water. Subsequently, the parts were left in a hot air dryer at 67° C. for 15 min to dry them. The obtained parts were closely wrapped with aluminum foil and further sealed in a plastic bag for storage.

The surfaces of the A5052 aluminum alloys with the above treatment were observed under an electron microscope. The surfaces were covered with countless ultrafine recesses, and these recesses had 20 to 40 nm diameter. Further, presence of nitrogen was confirmed by XPS observation. The size of nitrogen atom peak by XPS (the sum of spectrum peaks of 10 measurements) was compared to that of the A5052 aluminum alloy with the treatment of the NMT 2 described in experimental example 1. The aluminum alloy of experimental example 1 had larger value than that of experimental example 2.

Experimental Example 3

Injection Joining

The body 41d, bottom 42d and metal ring 43d, which were treated with the surface treatment of experimental example 1, were assembled together as shown in FIG. 5, and inserted into an injection mold at a temperature of 140° C. The in-mold protrusion 50 was fitted into the hole 48. The in-mold protrusion 50 had a pin gate 51 carved therein. After closing the injection mold and warming the body 41d, bottom 42d and metal ring 43d for approximately 10 sec, the commercially available PPS resin for the NMT "SGX120 (Tosoh Corp.)" was injected. The injection molding was performed at an injection temperature of 300° C. and a mold temperature of 140° C. The structure 40d shown in FIG. 6 was thus obtained. This is a composite for sealing test manufactured by the NMT 2.

As with the structure 40d, the structure 40b was prepared from the body 41b, bottom 42b and metal ring 43b, which were treated with the surface treatment of experimental example 2. This is a composite for sealing test manufactured by the NMT. The structures 40b and 40d as prepared above were annealed in a hot air dryer at 170° C. for 1 hour.

Experimental Example 4

Measurement of Sealing Properties (NMT, NMT 2)

The gas sealing properties of the structures 40b and 40d, which were prepared in experimental example 3, were measured by the measuring arrangement shown in FIG. 8. The protrusion on the center of the upper face of the structure 40b was connected to the pipe 132 by the Swagelok pipe joint 131, and the inside of the autoclave 130 is put into a sealed condition. Valves are controlled so that the cavity of the structure 40b is substituted with helium, and the pressure in the cavity is adjusted approximately 0.2 MPa. Subsequently, the autoclave 130 is evacuated to produce a vacuum at the level of several mmHg by use of the vacuum pump 150, and argon gas was then charged to bring the pressure back to approximately ordinary pressure. This operation was repeated once more so that the inside of the autoclave 130 is almost 100% argon. Subsequently, the autoclave pressure was finely adjusted to be 0.11 MPa by absolute pressure, which is slightly higher than ordinary pressure. Subsequently, the pressure in the cavity of the structure 40b was increased to 0.61 MPa. The gas sealing test was started in this condition.

The amount of helium contained in the gas in the autoclave 130 after 3 days (72 hours) from starting the test was calculated by analyzing the gas sampled in the sampling container 160. Three structures 40b were subjected to the same test, and the results are shown in table 1 (NMT) and FIG. 10. One of the structures 40b was subjected to the measurement of the amount of helium after 7 days (168 hours) from starting the test. In the same manner, three structures 40d were also subjected to the measurement of the amount of helium. The results are shown in table 1 (NMT 2) and FIG. 10.

Figure 10:
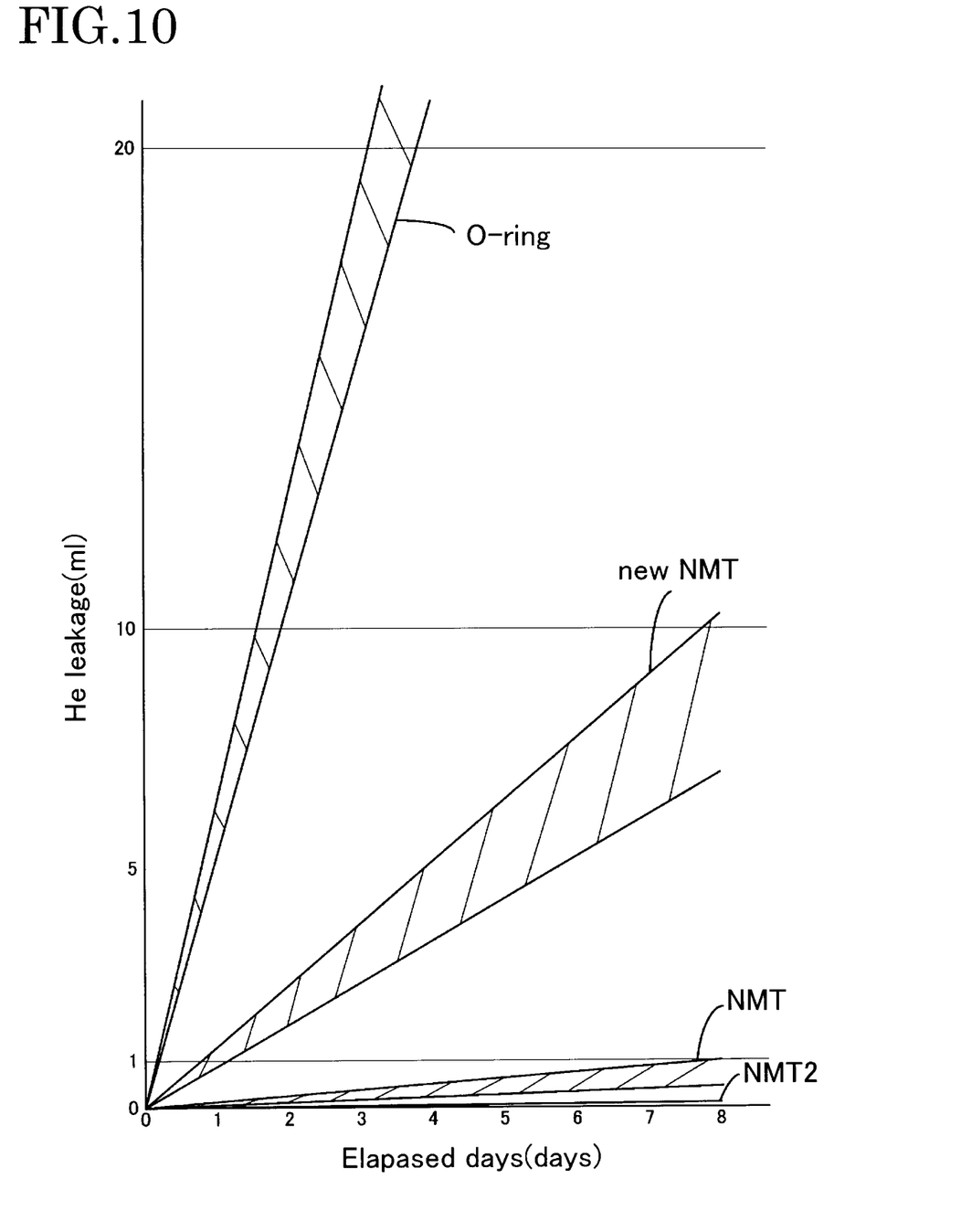
FIG. 10 is a chart showing the amounts of helium leakage of different composites.

As shown in table 1 and FIG. 10, the structures 40b by the NMT had a helium leakage of 0.10 to 0.22 ml after 72 hours and 0.25 ml after 168 hours. In the case of the O-ring sealing described below, the helium leakage was 17 to 19 ml after 72 hours, and there was a difference of approximately 100 times. It can thus be said that the gas sealing properties by the NMT is good.

The structure 40d was subjected to the same experiment as the structure 40b. The structure 40d by the NMT 2 had further higher gas sealing properties than one by the NMT. As shown in table 1 and FIG. 10, the structure 40d by the NMT 2 had a helium leakage of 0.01 ml after 72 hours. As described above, the structure 40d by the NMT 2 had very low helium leakage that was less than one-tenth of that by the NMT.

Experimental Example 5

Measurement of Sealing Properties (Extension of Measurement Period in the Case of the NMT 2)

It is demonstrated in experimental example 4 that the NMT 2 provides very high gas sealing properties. However, since the amount of helium leakage is too low, reliability of the values is concerned. Thus, one of the structures 40d by the NMT 2 was subjected to the measurement of the amount of helium leakage after 28 days (672 hours) from starting the test. The result is shown in table 1 and FIG. 10. The leakage rate was approximately 0.0002 ml/hour, and the value after the shape-based correction was 0.0002×0.2/4.71=8.5×10$^{-6}$ ml/h. However, if there is even a slight amount of gas leakage from the Swagelok pipe joint 131, the measured amount of leakage may include it. In this case, the actual amount of helium leakage is further lower. It might thus be impossible to precisely measure the gas sealing properties by the NMT 2 by means of the experiment of this level.

Experimental Example 6

Preparation of C1100 Copper Alloy part (New NMT-Treated) and Injection Joining (New NMT Treatment of C1100 Copper Alloy Part)

To prepare the structure 40c shown in FIG. 5, a C1100 copper alloy part of the body 41c, A5052 aluminum alloy parts of the bottom 42c and metal ring 43c were prepared. The body 41c was treated with the surface treatment for C1100 of the new NMT, and the bottom 42c and metal ring 43c were treated with the surface treatment for A5052 of the NMT. The specific process of the surface treatment of NMT was completely the same as one described in experimental example 2. The surface treatment of the new NMT for the C1100 copper material was performed as follows. First, aqueous solution (solution temperature of 60° C.) containing 7.5% of the aluminum degreasing agent "NE-6" was prepared, and a degreasing bath with the degreasing solution was prepared. The body 41c of C1100 copper alloy was immersed therein for 5 min, and then washed with tap water (Ota-city, Gunma). Subsequently, aqueous solution (40° C.) containing 1.5% sodium hydroxide was prepared in another tub, so as to prepare a base pre-cleaning bath. The part was immersed in this base pre-cleaning bath for 1 min, and then washed with ion exchanged water.

Subsequently, aqueous solution (solution temperature of 40° C.) containing 10% nitric acid was prepared in another tub, and the part was immersed therein for 0.5 min. Subsequently, aqueous solution (40° C.) containing 3% nitric acid was prepared in another tub, and the part was immersed therein for 10 min, and then washed with ion-exchanged water. Subsequently, aqueous solution (25° C.) of 10% sulfuric acid, 6% hydrogen peroxide and 0.3% trisodium phosphate hydrate was prepared in another tub, so as to prepare an etching bath. The part was immersed in this etching bath for 1 min, and then washed with ion exchanged water. Subsequently, aqueous solution containing 2% nitric acid was prepared in another tub, and the part was immersed therein for 0.5 min and then washed well with ion exchanged water. Subsequently, solution (70° C.) containing 3% potassium hydroxide and 2% potassium permanganate was prepared in another tub, so as to prepare an oxidation treatment bath. The part was immersed in this oxidation treatment bath for 3 min, and then washed well with ion exchanged water. Subsequently, the part was left in a hot air dryer at 80° C. for 15 min to dry it. The obtained part was closely wrapped with aluminum foil and further sealed in a plastic bag for storage.

(New NMT Treatment of C1100 Copper Alloy Piece)

Figure 9:
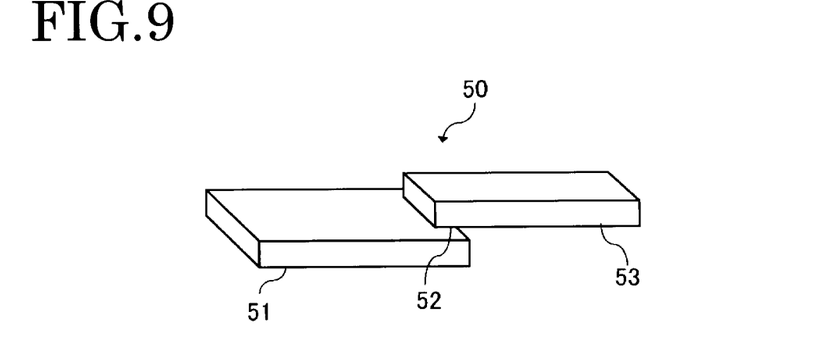
FIG. 9 is a perspective view of a composite for measuring joining strength.

A C1100 copper alloy piece of 45 mm×18 mm×1.5 mm thick was treated with the new NMT treatment as with the above-described part. The PPS resin "SGX 120 (Tosoh Corp.)" was injected onto the surface of this C1100 copper alloy piece with the surface treatment, so as to obtain a plate-shaped molded product. The obtained composite 50 has a structure that a C1100 copper alloy plate 51 is joined with a molded resin 53 by injection joining, and an joint part 52 has an area of 0.5 cm$^2$. After the injection joining, the composite 50 was annealed at 170° C. for approximately 1 hour, and then fractured by tensile stress. The shear fracture strength was 22 MPa on average of three samples. The C1100 copper alloy piece was integrated with the molded PPS resin with very strong joining strength as high as that by the NMT.

(Injection Joining)

A body 41c with the surface treatment of the new NMT and a bottom 42c and a metal ring 43c with the surface treatment of the NMT were assembled together as shown in FIG. 5 and inserted into an injection mold at a temperature of 140° C., and an in-mold protrusion 50 was fitted into a hole 48. The in-mold protrusion 50 had a carved a pin gate 51. After closing the injection mold and warming the body 41c, bottom 42c and metal ring 43c for approximately 10 sec, the commercially available PPS resin "SGX 120 (Tosoh Corp.)" was injected. The injection molding was performed at an injection temperature of 300° C. and mold temperature of 140° C. The structure 40c shown in FIG. 6 was thus obtained. This is a composite for sealing test manufactured by the new NMT. The structure 40c as prepared above was annealed in a hot air dryer at 170° C. for 1 hour.

Experimental Example 7

Measurement of Sealing Property (C1100 Copper)

The structure 40c that was prepared in experimental example 6 was subjected to the measurement of gas sealing properties in the same manner as experimental example 4. The result is shown in table 1 and FIG. 10. As shown in table 1 and FIG. 10, the structure 40c by the new NMT had a helium leakage of 2.6 ml after 72 hours and 3.9 ml. Accordingly, the structure 40c by the new NMT had a helium leakage 10 times higher than that by the NMT, and its gas sealing properties was inferior to that of the NMT 2 naturally, as well as the NMT. The leakage rate was 0.036 to 0.054 ml/h, which was fairly inferior to that of the NMT.

Experimental Example 8

Measurement of Sealing Properties (O-ring)

The structure 40a with an O-ring was subjected to the measurement of gas sealing properties in the same manner with experimental example 4. Three structures 40a were subjected to the measurement of gas sealing properties, where the bolts/nuts, which press the O-ring in the vertical direction, were clenched at different strengths. The clenching strengths were of three levels "normal", "semi-strong" and "strong". The result is shown in table 1 and FIG. 10. As shown in table 1 and FIG. 10, the structure 40a with an O-ring had a helium leakage of 15 to 19 ml after 72 hours, and its sealing properties were by far inferior to even that of the structure 40c by the new NMT. Even when the O-ring was clenched stronger than "normal", the amount of helium leakage did not change largely.

TABLE 1

| Joined product | Joining method | Amount of helium leakage (ml) | | | Leakage rate (ml/h) |
| --- | --- | --- | --- | --- | --- |
| | | 72 hours | 168 hours | 672 hours | |
| A5052/SGX120 injection-joined product | NMT | 0.22 0.15 0.10 | 0.25 | | 0.003 0.002 0.0015 |

TABLE 1-continued

| Joined product | Joining method | | Amount of helium leakage (ml) | | | Leakage rate (ml/h) |
| --- | --- | --- | --- | --- | --- | --- |
| | | | 72 hours | 168 hours | 672 hours | |
| | NMT 2 | | 0.01 | | | 0.0001 |
| | | | 0.01 | | | 0.0001 |
| | | | 0.01 | | 0.13 | 0.0002 |
| A1050/SGX120 injection-joined product | NMT 2 (dimethylamine) | | 0.04 | | | 0.0005 |
| | NMT 2 (ethanol amine) | | 0.04 | | | 0.0005 |
| C1100/SGX120 injection-joined product | new NMT | | 3.9 | | | 0.054 |
| | | | 2.6 | | | 0.036 |
| O-ring sealed product | O-ring tightening | normal | 19 | | | 0.26 |
| | | semi-strong | 15 | | | 0.21 |
| | | strong | 17 | | | 0.24 |

Experimental Example 9

Experiment of Gas Sealing Properties by the NMT 2 (with Dimethylamine)

The present inventors also prepared a structure 40d that includes a body 41d made of A1050 aluminum alloy material. In experimental example 9, the body 41d is an A1050 aluminum alloy part with the surface treatment of the NMT 2, and a bottom 42d and metal ring 43d are A5052 aluminum alloy parts with the surface treatment of the NMT. The surface treatment of the NM2 for the A1050 aluminum alloy material was performed as follows. First, aqueous solution (solution temperature of 60° C.) containing 7.5% of an aluminum degreasing agent "NE-6 (Meltex Inc.)" was prepared as degreasing solution, and a degreasing bath with the degreasing solution was prepared. The A1050 aluminum alloy part (a shaped part to be the body 41d) was immersed therein for 5 min, and then washed with tap water (Ota-city, Gunma). Subsequently, aqueous solution (40° C.) containing 1% hydrochloric acid was prepared in another tub, so as to prepare an acid pre-cleaning bath. The part was immersed in this acid pre-cleaning bath for 1 min, and then washed with ion exchanged water.

Subsequently, aqueous solution (solution temperature of 40° C.) containing 1.5% sodium hydroxide was prepared in another tub, so as to prepare an etching bath. The part was immersed in this etching bath for 4 min, and then washed with ion-exchanged water. Subsequently, aqueous solution (40° C.) containing 3% nitric acid was prepared in another tub, so as to prepare a neutralizing bath. The part was immersed in this neutralizing bath for 3 min, and then washed with ion-exchanged water. Subsequently, aqueous solution (60° C.) containing 3.5% hydrazine hydrate was prepared in another tub, so as to prepare a first NMT treatment bath. The part was immersed in this first NMT treatment bath for 1 min. Subsequently, aqueous solution (20° C.) containing 0.1% dimethylamine was prepared in another tub, so as to prepare a second NMT treatment bath. The part was immersed in this second NMT treatment bath for 8 min, and then washed with ion exchanged water. Subsequently, the part was left in a hot air dryer at 50° C. for 40 min to dry it. The obtained part was closely wrapped with aluminum foil and further sealed in a plastic bag for storage.

The surface of the A1050 aluminum alloy treated with the above-described treatment was observed under an electron microscope. The surface was covered with countless ultrafine recesses, and the recesses had 30 to 50 nm diameter. Further, presence of nitrogen was confirmed by XPS observation.

The body 41d of A1050 aluminum alloy with the above-described surface treatment, bottom 42d and metal ring 43d were assembled together as shown in FIG. 5 and inserted into an injection mold at 140° C., and an in-mold protrusion 50 was fitted into a hole 48. Thereafter, the PPS resin "SGX120 (Tosoh Corp.)" was injected in completely the same manner as experimental example 3, so as to obtain the injection-joined product 40d. Subsequently, as with experimental example 3, it was annealed in a hot air dryer at 170° C. for 1 hour.

Subsequently, the gas sealing properties were measured by the measuring arrangement shown in FIG. 8 in completely the same manner as experimental example 4. The amount of helium contained in the gas in the autoclave 130 after 3 days (72 hours) from starting the test was calculated by analyzing the gas sampled in the sampling container 160. As a result, the amount of helium leakage was 0.04 ml, which was extremely low.

Experimental Example 10

Experiment of Gas Sealing Properties by the NMT 2 (with Ethanol Amine)

An experiment was conducted in the same manner as experimental example 9 except for the surface treatment of the body 42. In the present experimental example, the surface treatment of the NMT 2 for the A1050 aluminum part (body 42d) was changed. Ethanol amine was used as the water-soluble amine compound of the second NMT treatment bath, and the immersion conditions were changed.

Specifically, the solution of the second NMT treatment bath was 0.15% aqueous solution of ethanol amine at a temperature of 40° C., and the immersion time was 1 min.

The body 41d of aluminum alloy 1050 with the above-described surface treatment, a bottom 42d and a metal ring 43d were assembled as shown in FIG. 5, and inserted into an injection mold at 140° C. The PPS resin "SGX120 (Tosoh Corp.)" was injected, so as to obtain the injection-joined product 40d. Subsequently, it was annealed in a hot air dryer at 170° C. for 1 hour.

Subsequently, the gas sealing properties were measured by the measuring arrangement shown in FIG. 8 in completely the same manner as experimental example 4. The amount of helium contained in the gas in the autoclave 130 after 3 days (72 hours) from starting the test was calculated by analyzing the gas sampled in the sampling container 160. As a result, the amount of helium leakage was 0.04 ml, which was extremely low.

[Comparison of Joining Strengths and Gas Sealing Properties]

By means of the NMT, the present inventors prepared 20 pieces of the composites 50 of A5052 aluminum alloy and a molded product of PPS resin "SGX 120" having a shape as shown in FIG. 9. The composites 50 were pulled by a tensile tester to apply shear force, and the fracture strengths at which the composites 50 rupture were measured. As a result, the shear fracture strengths were approximately 25 to 30 MPa. Also, by means of the NMT 2, pieces of the composites 50 of an A5052 aluminum alloy and a molded product of PPS resin "SGX 120" having a shape as shown in FIG. 9 were prepared and subjected to the same experiment. The shear fracture strengths were approximately 25 to 30 MPa. Thus, the NMT and NMT 2 provide the same joining strength. On the other hand, comparing the gas sealing properties, the structure 40b by the NMT has a leakage rate of 0.0015 to 0.003 ml/h, while the structure 40d by the NMT 2 has a leakage rate of 0.0001 to 0.0002 ml/h (in the case where the body 41d is made of A5052 aluminum alloy). Consequently, while the NMT and NMT 2 provide the same joining strength, there is approximately a ten times difference between their gas sealing performances.

Including the case where the body 41d is made of A1050 aluminum alloy, the structures 40d by the NMT 2 have a leakage rate of 0.0001 to 0.0005 ml/h. The above-described shape-corrected value obtained by multiplying this by the flow path length (0.2 cm) and further dividing by the sealing length (4.71 cm) is $(0.0001 \text{ to } 0.0005) \times 0.2/4.71 = (4.2 \text{ to } 21) \times 10^{-6}$ ml/h. On the other hand, the structure 40b by the NMT has a leakage rate of 0.0015 to 0.003 ml/h. The above-described shape-corrected value obtained by multiplying this by the flow path length (0.2 cm) and further divided by the sealing length (4.71 cm) is $(0.0015 \text{ to } 0.003) \times 0.2/4.71 = (6.4 \text{ to } 12.7) \times 10^{-5}$ ml/h. By means of the NMT 2, which the present inventors developed, the shape-corrected value is greatly improved compared to the conventional NMT. Comparing the NMT with the NMT 2 by use of the same material (A5052), there is approximately a ten times difference between their gas sealing performances as described above. Such gas sealing techniques using resin that provide a shape-corrected value of $3 \times 10^{-5}$ ml/h or less were an unthinkable technique in the past. By means of the NMT 2, the shape-corrected helium leakage rate under ordinary temperature can be decreased to $3 \times 10^{-5}$ ml/h or less. This is the feature of the present invention.

The shape-corrected helium leakage rate is proportional to the pressure difference up to 1 MPa, and is considered to be also affected by the test temperature. It is presumed that vibration and migration rate of molecules become more intense at higher temperature, and the leakage rate thus increases. The present inventors conducted the above experiments at 25° to 30° C.

In contrast, the structure 40a with an O-ring had a helium leakage of 15 to 19 ml after 72 hours from starting the experiment and a leakage rate of 0.21 to 0.26 ml/h. The leakage amount is approximately 100 times as high as that of NMT, and approximately 1,000 times as high as that of NMT 2. The shape-corrected value obtained by dividing the leakage rate by the circumferential length 6.91 cm is $(0.21 \text{ to } 0.26)/6.91 = (2.9 \text{ to } 3.8) \times 10^{-2}$ ml/cmh.

The structure 40c by the new NMT had a helium leakage of 2.6 to 3.9 ml after 72 hours from starting the experiment and a leakage rate of 0.036 to 0.054 ml/h. These data are values of the sample of C1100 copper with the surface treatment of the new NMT as described in experimental example 6, and the values would be different depending on the metal alloy and process of the surface treatment of the new NMT that if developed for the corresponding metal alloy. However, the metal alloy surface with the surface treatment of the new NMT has a structure as shown in FIG. 2, where there are scattered gaps that are neither the metal alloy phase including the surface coat layer nor resin phase. It is evident that these gaps have negative influence on the amount of leakage and leakage rate, when compared with the feature of gaps shown in FIG. 1, which schematically shows a cross section of the injection-joined product by the NMT. From such a perspective, it was suggested the leakage rates would have different values ranging approximately from 0.01 to 0.1 ml/h if different metal alloys with the new NMT treatment had been subjected to the same experiment.

In any way, in the case of the C1100 copper, the amount of leakage was approximately 10 times as high as that of the NMT, and approximately 100 times as high as that of the NMT 2. In contrast, when compared to the case of O-ring tightening, the amount of leakage in the case of the C1100 copper and the new NMT was approximately one fifth of that of an O-ring. In this case of the C1100 copper and the new NMT, the above-described shape-corrected value obtained by multiplying the leakage rate by the flow path length (0.2 cm) and further dividing by the sealing length (4.71 cm) is $(0.036 \text{ to } 0.054) \times 0.2/4.71 = (1.5 \text{ to } 2.3) \times 10^{-3}$ ml/h.

[Structure of Lithium-Ion Battery Lid]

As shown in the above experimental results, the NMT 2 provides the best gas sealing properties, and the NMT follows. However, the NMT and NMT 2 are techniques for firmly injection-joining aluminum alloy with resin. Lithium-ion batteries use aluminum and copper for their outlet electrodes. Therefore, while the NMT and NMT 2 are applicable for the aluminum electrodes, the new NMT has to be applied to the copper electrodes, which results a problem that the gas sealing properties by the NMT or NMT 2 are impaired as a whole lithium-ion battery lid. Although the new NMT provides better gas sealing properties than the O-ring technique, low sealing properties of the copper electrodes cancel the best sealing properties of the aluminum electrodes.

Figure 11:
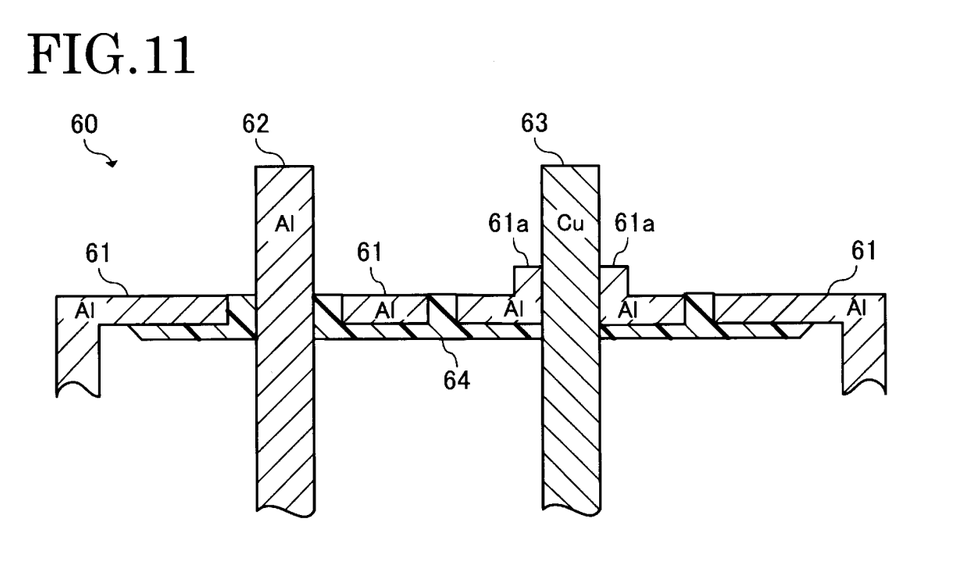
FIG. 11 is a cross-sectional view showing an example of a lid structure of a lithium-ion battery.

In order to prevent penetration of external moisture for a long period, it is therefore preferable to seal the sealing part between metal and resin by the NMT or NMT 2. As a result of considering the structure of lithium-ion battery lids in this regard, the optimum structure was concluded to be a structure as shown in FIG. 11. According to the structure of a lithium-ion battery lid 60, a lid 61 is made of aluminum alloy, and a thermoplastic resin composition 64 seals a gap between a through hole and an aluminum electrode 62, which is left after the lid 61 is closed, as well as a gap between a through hole and a aluminum alloy part 61a, which is left after the lid 61 is closed. In order to eliminate a gap between a copper electrode 63 and the lid 61, the aluminum alloy part 61a is winded around the copper electrode 63 and engaged in the copper surface. Since the lid 61, aluminum alloy part 61a and aluminum electrode 62 are treated with the surface treatment of the NMT or NMT 2, firm joining is established between the thermoplastic resin composition 64 and lid 61 as well as between the thermoplastic resin composition 64 and aluminum electrode 62, and very high gas sealing properties are thus established. Also, firm joining by the NMT or NMT 2 is established between the thermoplastic resin composition 64 and the aluminum alloy part 61a that is engaged with the copper electrode 63, and very high gas sealing properties are thus established. Furthermore, the thermoplastic resin composition 64 seals a gap between the aluminum alloy 61a and lid 61. The thermoplastic resin composition 64 covers the part of the back face of the lid 61 and aluminum alloy part 61a that comes in contact with electrolyte.

The key point of the lithium-ion battery lid 60 shown in FIG. 11 is that the gap between the aluminum electrode 62 and lid 61 and the gap between an outlet of the copper electrode 63 and lid 61 are both sealed by means of the NMT or NMT 2. In the lithium-ion battery lid 60, the gas sealing properties are poor at the periphery of the copper electrode 63. To cope with this, an aluminum alloy structure having a shape surrounding the copper 63 is formed, and the attached aluminum alloy is made closely contact with the copper electrode 63 and further made engaged into the copper electrode 63 by pressing or forging. It is then machined into a predetermined shape so as to prepare the copper alloy 63 attached with the aluminum alloy part 61a. Subsequently, the surface treatment of the NMT or NMT 2 is given to the three members of the aluminum electrode 62, copper electrode 63 attached with the aluminum alloy part 61a and aluminum alloy lid 61. These three members are inserted into a metal injection mold, and the thermoplastic resin composition 64 such as PPS resin is injected. The lithium-ion battery lid 60 having a structure as shown in FIG. 11 is thus obtained. With this configuration, the gas sealing properties are greatly improved compared to the O-ring sealing. With the structure shown in FIG. 11, electrolyte can maintain its composition at the time of assembling the battery for a long time, which enables to extend the battery life.

INDUSTRIAL APPLICABILITY

The present invention is a technique relating to joining between aluminum alloy and thermoplastic resin, and is applicable mainly in the manufacture of electronic equipment and batteries and the parts manufacture of electronic equipment and transportation equipment. In particular, the present invention is suitably applicable in the manufacture of capacitors and lithium-ion batteries.

DESCRIPTION OF REFERENCE NUMERALS

10 aluminum alloy
11 metal alloy
20 resin
21 resin
30 aluminum oxide
31 metal oxide or metallic phosphate
40a structure with O-ring
40b structure manufactured by NMT
40c structure manufactured by new NMT
40d structure manufactured by NMT 2

The invention claimed is:

1. A method for manufacturing a metal-resin composite, comprising:
   an etching step of immersing an aluminum alloy in first water-soluble amine compound aqueous solution, so as to cover a surface of the aluminum alloy by ultrafine asperities of 20 to 80 nm period or ultrafine recesses or projections of 20 to 80 nm diameter, as well as to let an amine compound adsorbed on the surface;
   an adsorbing step of immersing the aluminum alloy obtained by the etching step in a second water-soluble amine compound aqueous solution of a concentration of 0.05% to 1% at 15° C. to 45° C. for 1 to 10 min, so as to increase an amount of the adsorbed amine compound;
   a drying step of drying the aluminum alloy obtained by the adsorbing step at 50° C. to 70° C.; and
   an injection-joining step of inserting the aluminum alloy obtained by the drying step into an injection mold and injecting a resin composition onto the surface of the aluminum alloy, so as to perform injection molding as well as to join a molded product of the resin composition with the aluminum alloy, wherein the resin composition comprises a rigid crystalline thermoplastic resin that is capable of reacting with the amine compound as a main component.

2. The method for manufacturing the metal-resin composite according to claim 1,
   wherein the first water-soluble amine compound aqueous solution is hydrazine hydrate aqueous solution, and the second water-soluble amine compound aqueous solution is any one selected from hydrazine hydrate solution, alkylamine solution and ethanol amine solution.

3. The method for manufacturing the metal-resin composite according to claim 1,
   wherein the resin composition comprises one or more selected from polybutylene terephthalate, polyphenylene sulfide and polyamide resin as the main component.

4. A metal-resin composite comprising:
   an aluminum alloy part wherein a surface is covered with ultrafine asperities of 20 to 80 nm period or ultrafine recesses or protrusions of 20 to 80 nm diameter, and the surface comprises a surface layer mainly composed of an aluminum oxide film having a thickness of 3 nm or more; and
   a molded product of a resin composition that is injected on the aluminum alloy part, the resin composition comprising one or more selected from polybutylene terephthalate, polyphenylene sulfide and polyamide resin as a main component,
   wherein a leakage rate of helium gas is approximately $3 \times 10^{-5}$ ml/h or less in a condition where the helium gas passes through by means of a pressure difference of 0.5 MPa from one room to the other room that are separated from each other by an joint part of the aluminum alloy part with the molded product in the metal-resin composite.

5. A lid of a lithium-ion battery that comprises an aluminum electrode and a non-aluminum electrode,
   wherein the lid is made of an aluminum alloy, surfaces of the lid and an outlet portion of the aluminum electrode are each covered with ultrafine asperities of 20 to 80 nm period or ultrafine recesses or protrusions of 20 to 80 nm diameter, and the surfaces each comprise a surface layer mainly composed of an aluminum oxide film having a thickness of 3 nm or more,
   an outlet portion of the non-aluminum electrode is covered with an aluminum alloy member that is engaged in the non-aluminum electrode, a surface of the aluminum alloy member is covered with ultrafine asperities of 20 to 80 nm period or ultrafine recesses or protrusions of 20 to 80 nm diameter, and the surface comprises a surface layer mainly composed of an aluminum oxide film having a thickness of 3 nm or more, and
   a gap between a through hole on the lid and the aluminum electrode and a gap between a through hole on the lid and the aluminum alloy member are sealed with a molded product of a resin composition that is injected on the surface of the lid, the resin composition comprising one or more selected from polybutylene terephthalate, polyphenylene sulfide and polyamide resin as a main component, wherein a leakage rate of helium gas is approximately $3 \times 10.\text{sup}.5$ ml/h or less in a condition where the helium gas passes through by means of a pressure difference of 0.5 MPa from one room to the other room that are separated from each other by an joint part of the aluminum alloy part with the molded product in the metal-resin composite.

6. The method for manufacturing the metal-resin composite according to claim 2,
   wherein the resin composition comprises one or more selected from polybutylene terephthalate, polyphenylene sulfide and polyamide resin as the main component.

* * * * *